(12) United States Patent
Calman et al.

(10) Patent No.: US 10,697,631 B2
(45) Date of Patent: Jun. 30, 2020

(54) ROLLER TOOL FOR USE IN APPLYING ADHESIVE SHEET MATERIAL TO SURFACES

(71) Applicant: Geek Wraps, Inc., Oakland Park, FL (US)

(72) Inventors: Kenneth J. Calman, Fort Lauderdale, FL (US); Kathryn S. Calman, Fort Lauderdale, FL (US)

(73) Assignee: Geek Wraps, Inc., Fort Lauderdale, FL (US)

( * ) Notice: Subject to any disclaimer, the term of this patent is extended or adjusted under 35 U.S.C. 154(b) by 544 days.

(21) Appl. No.: 15/237,322

(22) Filed: Aug. 15, 2016

(65) Prior Publication Data

US 2016/0348902 A1    Dec. 1, 2016

Related U.S. Application Data

(63) Continuation of application No. 13/412,192, filed on Mar. 5, 2012, now Pat. No. 9,415,540.

(60) Provisional application No. 61/516,456, filed on Apr. 4, 2011.

(51) Int. Cl.
| | | |
|---|---|---|
| B32B 37/00 | (2006.01) |
| F23D 99/00 | (2010.01) |
| B29C 65/10 | (2006.01) |
| B29C 65/00 | (2006.01) |
| B29C 63/02 | (2006.01) |
| B29C 65/02 | (2006.01) |
| B29C 65/48 | (2006.01) |
| F23D 14/08 | (2006.01) |
| F23D 14/38 | (2006.01) |

(52) U.S. Cl.
CPC ............. *F23D 91/02* (2015.07); *B29C 63/02* (2013.01); *B29C 65/02* (2013.01); *B29C 65/10* (2013.01); *B29C 65/106* (2013.01); *B29C 65/48* (2013.01); *B29C 66/83411* (2013.01); *F23D 14/085* (2013.01); *F23D 14/38* (2013.01)

(58) Field of Classification Search
CPC ......... F23D 91/02; B29C 63/02; B29C 65/02; B29C 65/10; B29C 65/106; B29C 65/48; B29C 66/83411
USPC .................................................. 156/497, 579
See application file for complete search history.

(56) References Cited

U.S. PATENT DOCUMENTS

| | | | | |
|---|---|---|---|---|
| 563,044 | A * | 6/1896 | Lewis ........................... 156/579 |
| 4,259,142 | A * | 3/1981 | Kortepeter .............. E04D 15/04 156/157 |
| 4,725,328 | A * | 2/1988 | Arnold .................. B29C 65/106 156/244.27 |
| 4,761,201 | A * | 8/1988 | Nichols, Jr. ............. E04D 15/06 156/497 |
| 5,069,732 | A * | 12/1991 | Levine ...................... B65C 9/30 100/211 |

* cited by examiner

*Primary Examiner* — James D Sells
(74) *Attorney, Agent, or Firm* — Ice Miller LLP

(57) ABSTRACT

A roller system is provided comprising a compressed gas source including a compressed flammable gas, and a roller attachment attached to at least one of the compressed gas source and nozzle.

18 Claims, 6 Drawing Sheets

EZ WRAP PRO

Kenneth Calman, Kathryn Calman

EZ WRAP PRO

Kenneth Calman, Kathryn Calman

ROLLER TOOL FOR USE IN APPLYING ADHESIVE SHEET MATERIAL TO SURFACES

RELATED APPLICATION DATA

This application is a continuation of U.S. application Ser. No. 13/412,192, filed Mar. 5, 2012, which claims the priority benefit of U.S. Provisional Application No. 61/516,456, filed Apr. 4, 2011, which are hereby incorporated in their entirety herein by reference.

FIELD OF THE INVENTION

The present invention relates to a roller tool for use in applying adhesive sheet material, such as adhesive bearing wraps and the like to surfaces.

BACKGROUND OF THE INVENTION

Adhesive sheet materials (especially those bearing graphics) are becoming the increasingly popular choice for advertising or otherwise displaying graphics on signs, automobiles, buildings, and numerous other surfaces. These materials typically include a vinyl material bearing desired images and/or text on the display side, with an adhesive on the application side. Such vinyl material is best applied once gently heated during the application process, the heat serving both to render the adhesive sheet material more pliable and thus amenable to compliance with the application surface contour, as well as activating the adhesive itself.

Often, the adhesive material must be heated in order to securely apply it to the intended substrate. Generally, a propane or other combustible gas torch is used to the heat the adhesive material. Uniform application, however, can often be difficult, as air bubbles commonly get trapped between the adhesive material and substrate.

Such methods can be cumbersome, and even dangerous for the applicator and/or bystanders, depending on the application environment, frequently requiring the use of several tools thus slowing the application process. Therefore, there remains a need for a tool that can allow a person quickly and flawlessly to apply adhesive sheet materials to surfaces. In this regard, it is desirable to be able to apply, relatively quickly and effectively, controllable heat to portions of an adhesive graphic material and to be able conveniently to position, affix, and smooth heated portions of the adhesive graphic material to the desired surface, typically in a repetitive progression.

SUMMARY OF THE INVENTION

The embodiments of the invention and the method described herein address the shortcomings of the prior art. In general terms, the invention may be described as including the following:

Fundamentally, the present invention includes a roller attachment adapted to be releasably attached to a gas cylinder, such that the gas cylinder or any constituent part thereof, such as a gas valve or nozzle, may function as a handle for the roller. It is preferred that the roller attachment include an optional additional handle portion, preferably arranged opposite the roller's facing surface, to allow the user to provide additional support or leverage in using the roller. It is also preferred that the roller attachment include an optional belt or pocket clip or equivalent mechanical means to allow the gas cylinder with roller attachment to be releasably attached to the user's belt, suspenders or clothing, to allow the user to temporarily hold provide additional support or leverage in using the roller.

In general terms, the invention includes a handheld gas container and attached roller system, comprising: (a) a compressed gas container containing a compressed flammable gas, and comprising a gas nozzle; and (b) a roller attachment attached to the compressed gas container, the roller having a roller surface.

In one embodiment of the present invention, the gas nozzle is directed to one side of the gas container's longitudinal axis, and the roller having a roller surface facing to that same side of the container's longitudinal axis when installed on, or affixed to, the gas container and/or gas nozzle. In a most preferred embodiment, the nozzle's directional axis is substantially coplanar with the directional line of the roller surface. See positional relationship between directional axis A and directional line B.

The present invention also includes a handheld gas container wherein the roller is removably attached by any functionally appropriate means to the compressed gas container. In a further preferred embodiment, the roller attachment comprises a compression ring adapted to extend around the compressed gas container or gas nozzle and to be removably attached to the compressed gas container or nozzle. This allows the operator to replace gas containers as they are exhausted, as well as to change rollers, such as for repair or replacement, or to use a roller of a different width, circumference or resilience.

The present invention also includes an embodiment wherein the roller attachment further comprises a handle. The handle may be integrally formed as part of the roller attachment or it may be removably attached thereto. Similarly, in another preferred embodiment of the present invention, the roller attachment further comprises a clip for hanging or otherwise attaching the roller attachment to the user's clothing or other structure. Such a clip may be integrally formed as part of the roller attachment or it may be removably attached thereto. In another embodiment, the roller attachment may further comprise both a handle and a clip, which may be integrally formed into one another, into the roller attachment, or removably attached thereto.

The roller attachment of the present invention may be comprised of any material such as plastic, resin, or metal of sufficient rigidity to hold the gas container securely in place. The roller of the present device is preferably comprised of a resilient polymer foam comprising neoprene. The resilience of the roller material may be varied to conform with the nature (e.g. hardness, uniformity, etc.) of the application surface. For example, a soft neoprene rubber roller may be used for a cement wall or a trailer comprising bolted panels, while a stiffer rubber might be used for applications to an inflated balloon or foam mat. The core of the roller may be comprised of any material such as metal or plastic, and is preferably comprised of aluminum.

The present invention also includes a handheld gas container and roller system, comprising: (a) a compressed gas container containing a compressed flammable gas, and comprising a gas nozzle; and (b) a roller attachment removably attached to the compressed gas container, the gas nozzle being directed to that same side of the container's longitudinal axis C (see the positional relationship between the direction of both directional axis A and directional line B, as compared to the continuing longitudinal axis C), and the roller having a roller surface facing to the one side of the container's longitudinal axis, and with the nozzle's directional axis being substantially coplanar with the directional line of the roller surface, i.e., the nozzle and roller face generally the same direction and preferably such that their directed actions are in the same plane.

The handheld gas container and roller system of the present invention may also include an embodiment wherein the roller attachment comprises a compression ring adapted to extend around the compressed gas container and to be removably attached to the compressed gas container. See the clip 12 extending alongside longitudinal axis C.

The present invention also includes a handheld gas container wherein the roller attachment further comprises a handle. The handle may be integrally formed as part of the roller attachment or may be removably attached to the gas cylinder independent of the roller attachment. Preferably, the handle extends substantially parallel the longitudinal axis of the container, on the opposite side of the container from the roller surface. Similarly, in another embodiment of the present invention, the roller attachment further comprises a pocket clip that may be integrally formed as part of the roller attachment or it may be removably attached independently. Preferably, the pocket clip extends from the roller attachment and parallel to the longitudinal axis of the container.

The present invention also includes a method of applying a sheet material to a surface by a heat-activated adhesive borne on the sheet material using a handheld gas container having a gas nozzle and an affixed roller, the method comprising the steps: (a) placing the sheet material against the surface having a contour; (b) orienting the handheld gas container so as to direct combusting gas from the a gas nozzle toward the sheet material; (c) orienting the handheld gas container so as to place the roller against the sheet material; and (d) smoothing the sheet material against the surface with the roller so as to adhere the sheet material onto the surface, such that the sheet material follows the contour of the surface. These steps may be repeated along the face of the sheet material as the sheet material is applied to a surface.

The present invention further includes a method of applying a sheet material to a surface by a heat-activated adhesive borne on the sheet material using a handheld gas container having a gas nozzle and an affixed roller, the method comprising the steps: (a) placing a first portion of the sheet material against (i.e., alongside or in contact with) a first portion of the surface having a first contour; (b) orienting the handheld gas container so as to direct combusting gas from the gas nozzle toward the first portion of the sheet material; (c) orienting the handheld gas container so as to place the roller against the first portion of the sheet material; and (d) smoothing the first portion of the sheet material against the first portion of the surface with the roller so as to adhere the first portion of the sheet material onto the first portion of surface, such that the first portion of the sheet material follows the first contour; and, thereafter, (h) placing a second portion of the sheet material against a second portion of the surface having a second contour; (i) orienting the handheld gas container so as to direct combusting gas from the a gas nozzle toward the second portion of the sheet material; (j) orienting the handheld gas container so as to place the roller against the second portion of the sheet material; and (k) smoothing the second portion of the sheet material against the second portion of the surface with the roller so as to adhere the second portion of the sheet material onto the second portion of surface, such that the second portion of the sheet material follows the second contour. These steps may be further repeated progressively to additional portions of the sheet material to apply them to further portions of the surface.

In a further embodiment, the method additionally comprises periodically replacing the container by detaching the roller and the nozzle from the container, and affixing the roller and the nozzle to a different container. Further, the method may also comprise replacing the container by detaching the roller and the nozzle from the container, and affixing the roller and the nozzle to a different container, and thereafter repeating steps (a)-(d). This method may additionally comprise replacing the container by detaching the roller and the nozzle from the container, and affixing the roller and the nozzle to a different container, and thereafter repeating steps (a)-(h). These steps may be carried out as required during the progressive application of the sheet material, such as when the gas cylinder is exhausted or the roller is worn.

The present invention also includes a releasable roller attachment for a gas cylinder, comprising: (a) a roller and (b) an attachment fixture adapted to be attached to a gas cylinder. The attachment fixture of the present invention may comprise a compression ring arrangement adapted to extend around and be attached to the gas cylinder. The fixture may be removeably or permanently attached.

In another embodiment, the releasable roller attachment additionally comprises a handle portion attached to the attachment fixture. Preferably, the releasable roller attachment has two opposing sides, wherein the roller is attached on a first opposing side, and additionally comprises a handle portion attached to a second opposing side. Similarly, in another embodiment, the releasable roller attachment additionally comprises a clip attached to the attachment fixture.

The present invention further includes a releasable roller attachment for a gas cylinder, comprising: (a) a roller; (b) an attachment fixture, wherein the attachment fixture comprises a compression ring arrangement adapted to extend around and be attached to a gas cylinder; and (c) a handle portion attached to said attachment fixture. In a more preferred embodiment of the releasable roller, the attachment fixture has two opposing sides, the roller attached on a first opposing side, and additionally comprising a handle portion attached to a second opposing side. In one embodiment, the releasable roller attachment additionally comprises a clip attached to the attachment fixture.

DETAILED DESCRIPTION OF THE PREFERRED EMBODIMENTS

In accordance with the foregoing summary, the following is a detailed description of the preferred embodiments of the invention, which are considered to be the best modes thereof. The preferred methods and systems herein described are not intended to be exhaustive or to limit the invention to the precise forms disclosed.

Figure 1:
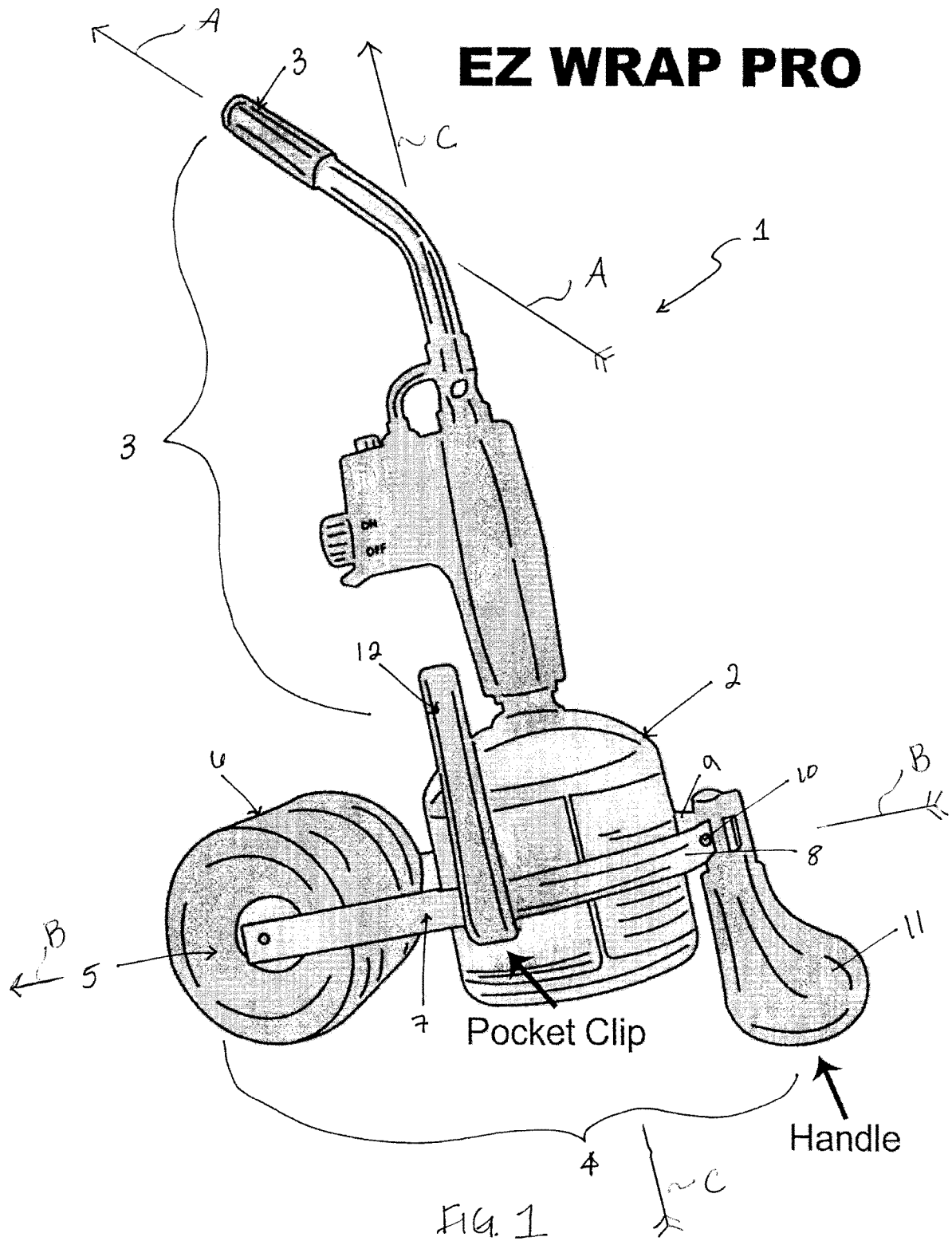
FIG. 1 is a side perspective view of a roller tool in accordance with one embodiment of the present invention.

FIG. 1 is a side perspective view of the roller tool in accordance with one embodiment of the present invention. FIG. 1 shows the roller tool 1 having a compressed gas container 2 containing a compressed flammable gas and further having a gas nozzle 3 through which the compressed flammable gas can be released for combustion.

FIG. 1 further shows roller tool 1 having a roller attachment 4. Roller attachment 4 further comprises a roller 5 having a roller surface 6. Roller 5 is attached to the compressed gas container 2 by the compression ring 7, which is attached at both ends of roller 5 and extends around the circumference of the compressed gas container 2.

In the preferred embodiment, compression ring 7 is comprised of two portions, ring portions 8 and 9, which are secured to one another by a screw 10. FIG. 1 also shows handle 11 attached to compression ring 7. The handle may be of any effective shape or orientation, though, in the preferred embodiment, handle 7 is contoured ergonomically to provide comfort and ease of use when rested in the palm of a user's hand. Finally, FIG. 1 shows clip 12 extending longitudinally along the roller tool 1 and attached to compression ring 7.

Figure 2:
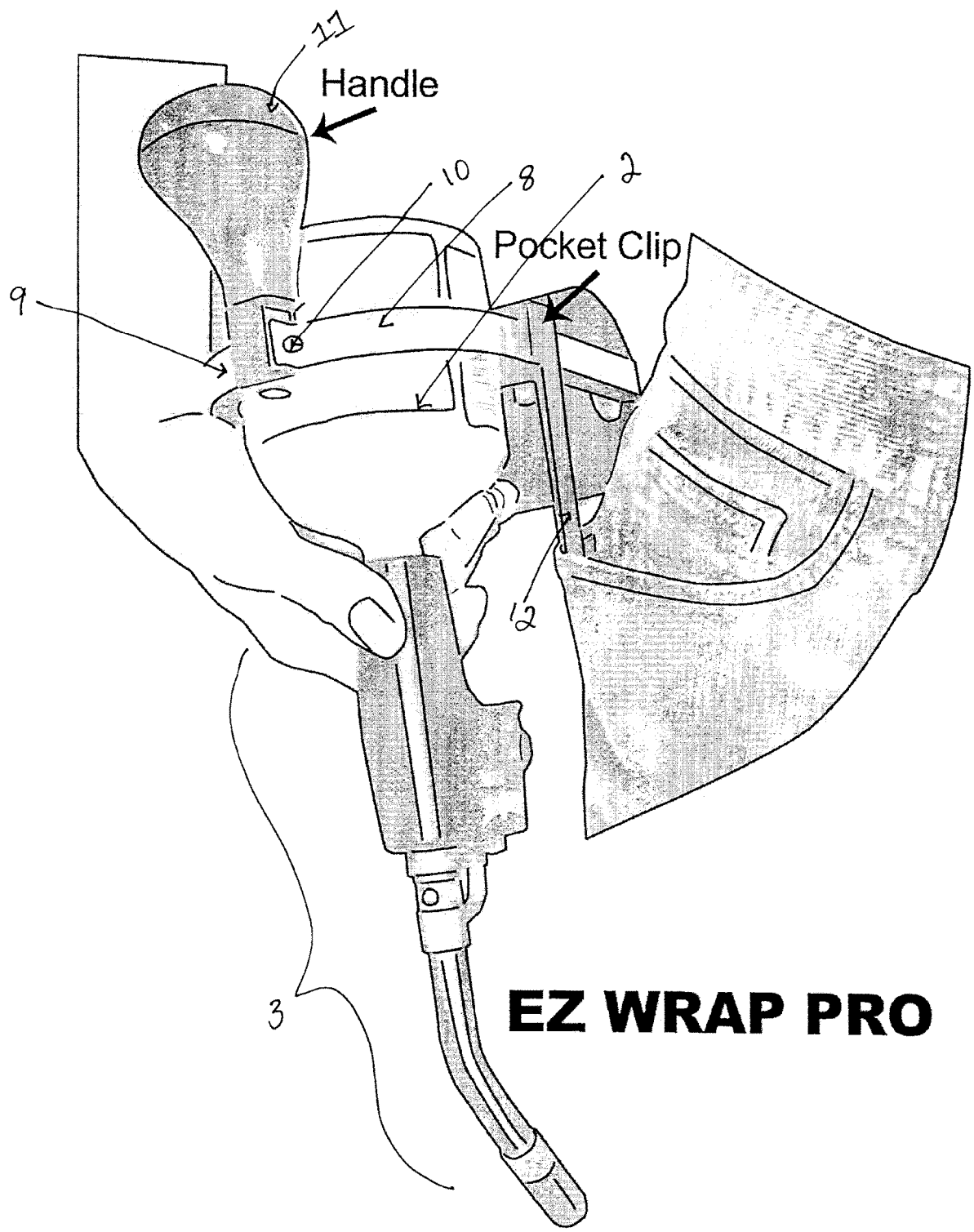
FIG. 2 is a front perspective view of a roller tool, as grasped by an operator when taking it from a clipped position in the operator's pocket, in accordance with one embodiment of the present invention.

FIG. 2 is a front perspective view of the roller tool 1 in accordance with one embodiment of the present invention as donned by a user, and shows how the clip 12 of the device can be employed by a user. The clip 12 extends longitudinally from the compression ring 7 such that a user can insert the pocket clip 12 into his or her pocket, such that the compressed gas container 2 and gas nozzle 3 will hang along the user's pant leg.

FIG. 2 also shows ring portions 8 and 9 attached to one another by means of screw 10. Handle 11 is also attached to ring portions 8 and 9 by screw 10.

Figure 3:
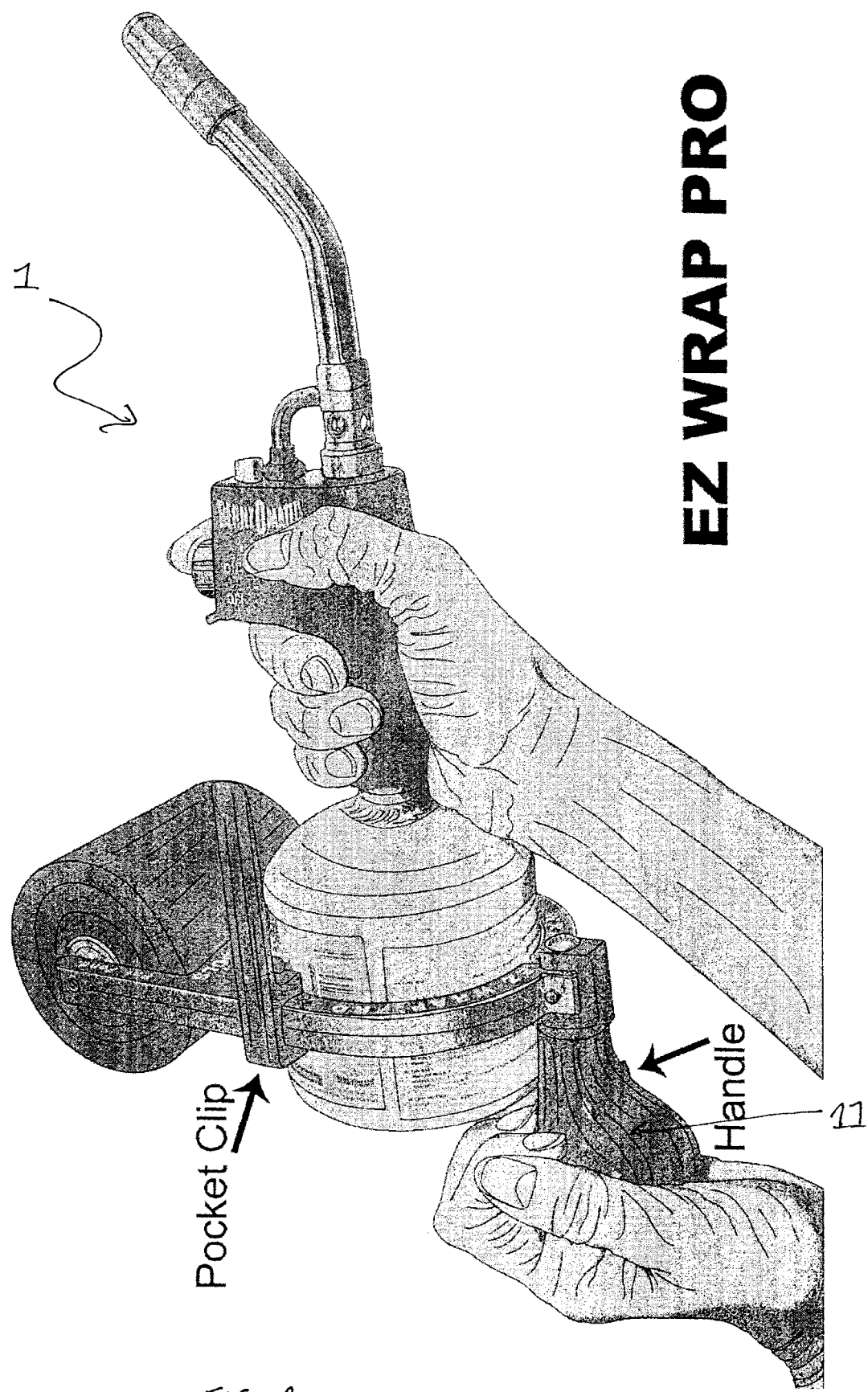
FIG. 3 is a side perspective view of a roller tool, as held by an operator in an operative position, in accordance with one embodiment of the present invention.

FIG. 3 is a side perspective view of the roller tool 1 in accordance with one embodiment of the present invention. FIG. 3 further shows a typical orientation in which a user can hold the roller tool, by grasping both handle 11 and nozzle handle portion 13 to orient the roller tool for smoothing a sheet material over a surface (not shown but see the similar orientation in FIG. 6).

Figure 4:
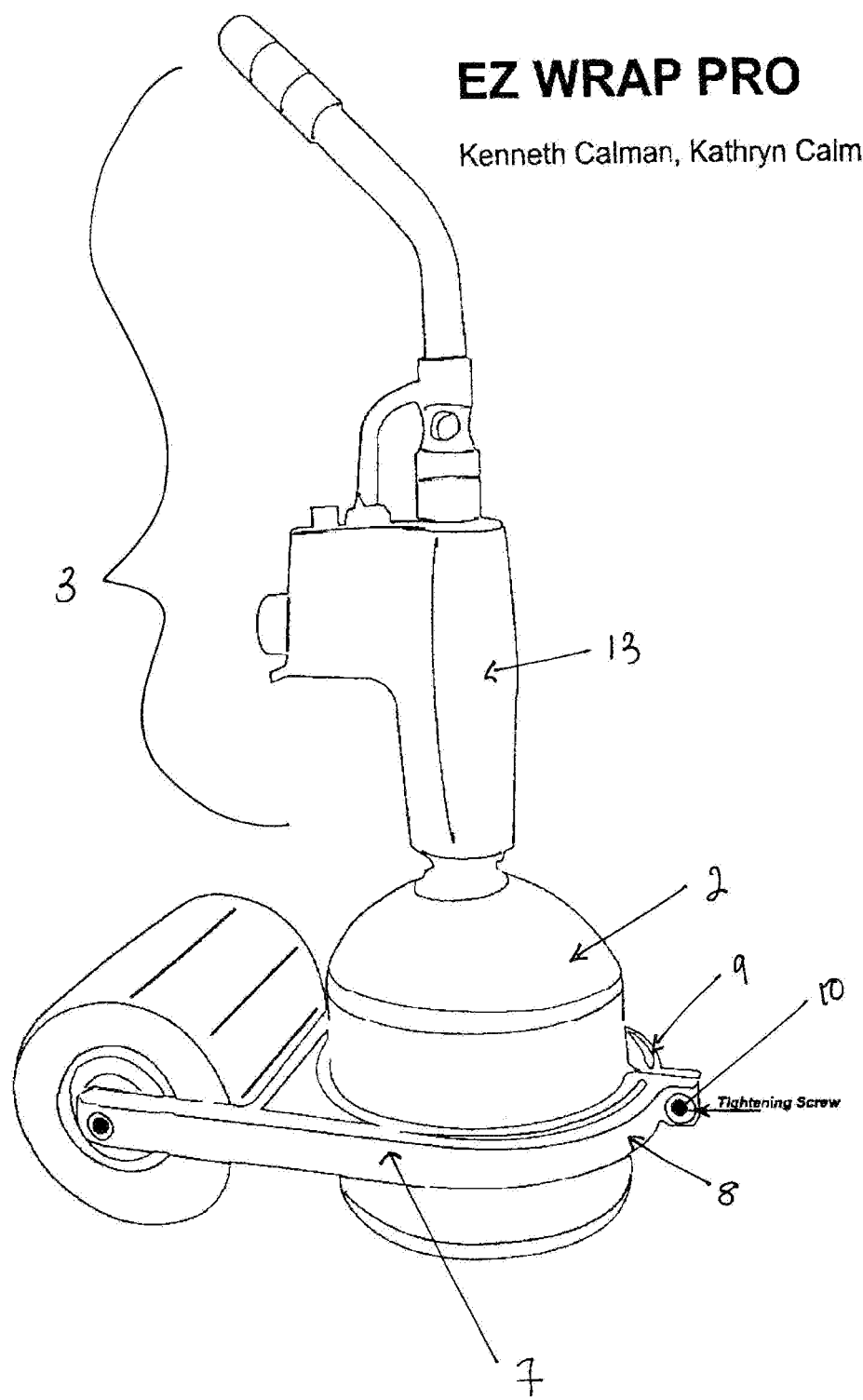
FIG. 4 is a side perspective view of a roller tool in accordance with one embodiment of the present invention.

FIG. 4 is a side perspective view of the roller tool 1 in accordance with one embodiment of the present invention. FIG. 4 shows screw 10 (i.e., without handle 11), attaching ring portions 8 and 9. The compression ring 7 thus can be tightened, loosened, or removed from compressed gas container 2 by screwing or unscrewing screw 10. In this embodiment of the present invention, a user can hold and control the roller device on the nozzle handle portion 13 of gas nozzle 3, for application of heat as in FIG. 5 or for rolling action as in FIG. 6.

Figure 5:
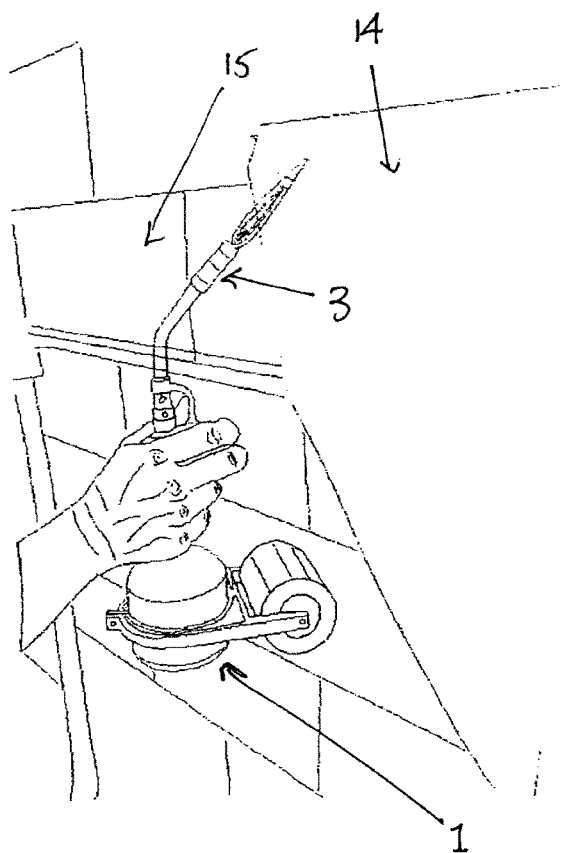
FIG. 5 is a side perspective view of a roller tool, as held by an operator in an operative position for applying heat to a section of a sheet material and applying it to a wall, in accordance with one embodiment of the present invention.
Figure 6:
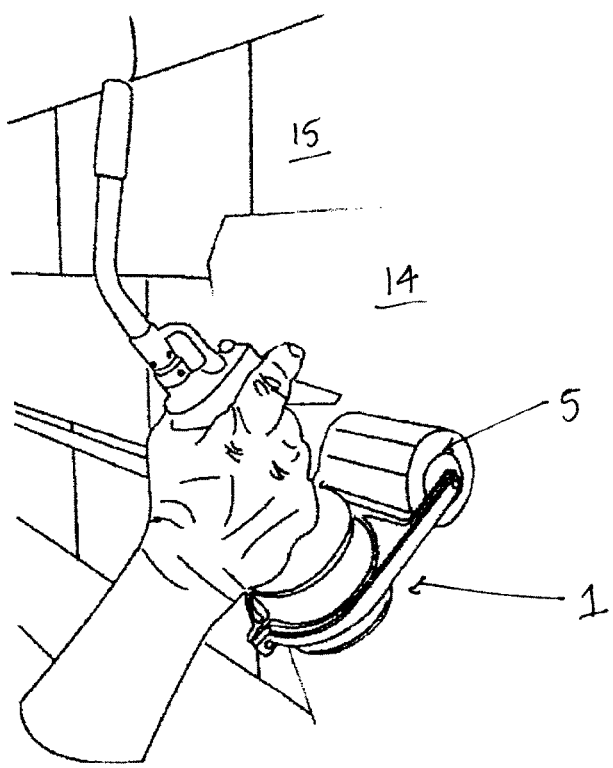
FIG. 6 is a side perspective view of a roller tool, as held by an operator in an operative position for rolling a heated section of a sheet material onto a wall, in accordance with one embodiment of the present invention.

FIGS. 5 and 6 are side perspective views of the roller tool 1 in two respective operator orientations, in accordance with one embodiment of the present invention. FIGS. 5 and 6 depict how the roller tool may be used. In FIG. 5, a user is heating adhesive material 14 to allow it to be initially adhered onto a portion of wall 15 by action of the flame from nozzle 3. In FIG. 6, the user has tilted roller tool 1 to a different orientation such that the roller 5 is directed toward and against a heated portion of the adhesive material 14 to be smoothed onto a corresponding portion of wall 15, and such that it applies pressure to the adhesive material 14 by rolling the roller 5 over the heated area of the adhesive material 14.

Figure 7:
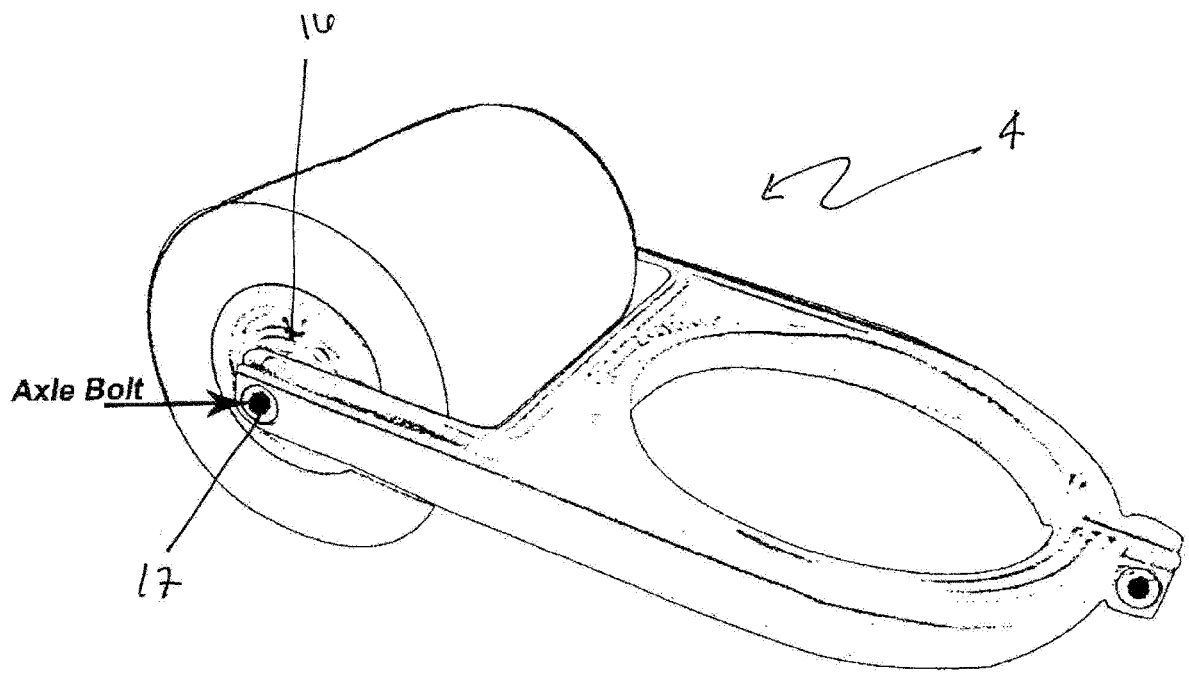
FIG. 7 is a side perspective view of the roller attachment 4 in accordance with one embodiment of the present invention.

FIG. 7 is a side perspective view of the roller attachment 4 in accordance with one embodiment of the present invention. FIG. 7 shows roller attachment 4 having roller 5 with roller surface 6. FIG. 7 further shows roller core 16 attached to compression ring 7 by axle bolts 17 at each end (the axle bolt for the opposite end of roller core 16 is not shown in this Figure).

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. An integrated roller system, comprising:
   a. a handle attachment portion having first and second sides;
   b. a roller portion attached to the first side of the handle attachment portion, the roller portion including a roller having a roller surface wherein said roller rotates about a longitudinal roller axis, and said handle attachment portion includes at least one ring extending substantially perpendicular to said longitudinal roller axis; and
   c. at least one handle attached to the second side of the handle attachment portion.

2. The system of claim 1, wherein the handle attachment portion includes at least one compression ring configured to compress said at least one handle.

3. The system of claim 1, wherein the roller rotates about a longitudinal roller axis, and wherein the at least one handle extends substantially perpendicular to the longitudinal roller axis.

4. The system of claim 1, wherein the at least one handle is removably attached to the handle attachment portion.

5. A releasable roller attachment for an integrated roller system, comprising:
   (a) a roller; and
   (b) an attachment fixture comprising a compression ring having two opposing sides, the roller attached on a first opposing side and a second opposing side;
   the attachment fixture adapted to be attached to at least one handle on its second opposing side.

6. The attachment of claim 5, wherein said compression ring arrangement is adapted to be attached to a gas container of a gas torch.

7. The attachment of claim 6, further comprising at least one handle attached to said second opposing side.

8. An apparatus, comprising:
   a compression ring to be removably coupled to a gas container of a gas torch, the compression ring comprising a first ring portion having a first roller end and a second ring portion having a second roller end;
   a roller coupled to the compression ring; and wherein the roller is coupled to the compression ring between the first roller end and the second roller end.

9. The apparatus of claim 8, further comprising a handle coupled to the compression ring.

10. The apparatus of claim 9, wherein the first ring portion comprises a first handle end and the second ring portions comprises a second handle end;

wherein the handle is coupled to the compression ring between the first handle end and the second handle end.

11. The apparatus of claim 10, wherein the first handle end, the second handle end, and the handle are coupled together by a removable fastener.

12. The apparatus of claim 9, wherein the handle is removably coupled to the compression ring.

13. The apparatus of claim 8, wherein the roller comprises a roller core; and wherein the roller core is coupled to the first roller end by a first axle attachment device and the second roller end by a second axle attachment device.

14. The apparatus of claim 8, further comprising a pocket clip coupled to the compression ring.

15. The apparatus of claim 8, further comprising:
(a) a gas torch comprising a handle portion and a gas container, wherein said compression ring is removably coupled to the gas container of the gas torch, and
(b) a handle coupled to the compression ring.

16. An integrated roller system, comprising:
(a) a gas torch comprising a handle portion and a gas container attached to the handle portion; and
(b) a handle attachment portion adapted to be removably attached to the gas container, and comprising: (1) a roller and (2) at least one handle attached to the handle attachment portion.

17. The system of claim 2, wherein the roller rotates about a longitudinal roller axis, and wherein the at least one handle extends substantially perpendicular to the longitudinal roller axis.

18. The system of claim 2, wherein the at least one handle is removably attached to the handle attachment portion.

* * * * *